(12) United States Patent
Lee et al.

(10) Patent No.: US 10,945,316 B2
(45) Date of Patent: *Mar. 9, 2021

(54) CONTROL METHODS, COMPUTER-READABLE MEDIA, AND CONTROLLERS

(71) Applicant: RAZER (ASIA-PACIFIC) PTE. LTD., Singapore (SG)

(72) Inventors: Michael Anthony Lee, Palo Alto, CA (US); Anthony P. Casano, Felton, CA (US)

(73) Assignee: RAZER (ASIA-PACIFIC) PTE. LTD., Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 16/511,400

(22) Filed: Jul. 15, 2019

(65) Prior Publication Data

US 2019/0342969 A1 Nov. 7, 2019

Related U.S. Application Data

(63) Continuation of application No. 15/773,488, filed as application No. PCT/SG2015/050429 on Nov. 3, 2015, now Pat. No. 10,398,001.

(51) Int. Cl.
*H05B 45/20* (2020.01)
*H05B 47/16* (2020.01)
(Continued)

(52) U.S. Cl.
CPC .......... *H05B 45/20* (2020.01); *H05B 47/105* (2020.01); *H05B 47/155* (2020.01); *H05B 47/16* (2020.01); *H05B 47/175* (2020.01)

(58) Field of Classification Search
CPC ............ H05B 33/0863; H05B 37/0281; H05B 37/029; H05B 37/0227; H05B 37/0245;
(Continued)

(56) References Cited

U.S. PATENT DOCUMENTS

| 7,939,774 B2 | 5/2011 | Corcoran et al. |
| 8,919,982 B2 | 12/2014 | Pulido, Jr. |

(Continued)

FOREIGN PATENT DOCUMENTS

| CN | 102652463 A | 8/2012 |
| CN | 202841602 U | 3/2013 |

(Continued)

OTHER PUBLICATIONS

International Search Report and Written Opinion, dated Jul. 26, 2016, for the corresponding International Application No. PCT/SG2015/050429 in 11 pages.

(Continued)

*Primary Examiner* — Raymond R Chai
(74) *Attorney, Agent, or Firm* — Polsinelli PC

(57) ABSTRACT

According to various embodiments, a control method may be provided. The control method may include: determining geometric information about respective geometries of respective housings of a plurality of light sources; determining a photographic representation of an environment in which the plurality of light sources are provided; determining spatial information about the plurality of light sources based on the geometric information and based on the photographic representation; determining control information for the plurality of light sources based on the spatial information; and controlling the plurality of light sources based on the control information.

16 Claims, 3 Drawing Sheets

(51) Int. Cl.
  *H05B 47/105* (2020.01)
  *H05B 47/155* (2020.01)
  *H05B 47/175* (2020.01)

(58) Field of Classification Search
  CPC ...... H05B 45/20; H05B 47/16; H05B 47/105; H05B 47/155; H05B 47/175
  See application file for complete search history.

(56) References Cited

U.S. PATENT DOCUMENTS

| | | | |
|---|---|---|---|
| 9,011,247 B2 | 4/2015 | Gronkowski et al. | |
| 9,084,312 B2 | 7/2015 | Cook | |
| 10,398,001 B2* | 8/2019 | Lee | H05B 47/105 |
| 2004/0105264 A1 | 6/2004 | Spero | |
| 2005/0248299 A1* | 11/2005 | Chemel | H05B 47/155 |
| | | | 315/312 |
| 2005/0275626 A1 | 12/2005 | Mueller et al. | |
| 2010/0244745 A1 | 9/2010 | Wendt | |
| 2010/0318201 A1 | 12/2010 | Cuppen et al. | |
| 2012/0286670 A1* | 11/2012 | Van Herk | H05B 47/155 |
| | | | 315/151 |
| 2013/0158952 A1 | 6/2013 | Liebel et al. | |
| 2014/0052278 A1* | 2/2014 | McGuire | H05B 47/19 |
| | | | 700/90 |
| 2014/0273818 A1 | 9/2014 | Sallas | |
| 2015/0012308 A1 | 1/2015 | Snyder | |
| 2015/0022123 A1 | 1/2015 | Van De Sluis et al. | |
| 2015/0081071 A1 | 3/2015 | Lea | |
| 2015/0248228 A1* | 9/2015 | Seuntiens | H05B 47/155 |
| | | | 715/765 |
| 2016/0071319 A1* | 3/2016 | Fallon | G06T 19/006 |
| | | | 345/633 |
| 2017/0052909 A1* | 2/2017 | Plancherel | G06F 13/102 |
| 2017/0103038 A1* | 4/2017 | Syed | G06F 13/4282 |

FOREIGN PATENT DOCUMENTS

| | | |
|---|---|---|
| CN | 203378121 U | 1/2014 |
| CN | 104976750 A | 10/2015 |
| JP | 2007-531232 A | 11/2017 |
| TW | 201129778 A1 | 9/2011 |
| WO | WO 2014/160519 | 2/2014 |

OTHER PUBLICATIONS

"With an App, Wham City finds its mainstream breakthrough", published May 21, 2013 by Wesley Case, The Baltimore Sun (http://articles.baltimoresun.com/2013-05-21/entertainment/bal-wham-city-lights-app_1_smartphone-app-dan-deacon-alan-resnick).

"Wham City Lights Basics", published Mar. 25, 2016 by Wham City Lights (https://web.archive.org/web/20160325054553/http://support.whamcitylights.com:80/hc/en-us/articles/203568079-Wham-City-Lights-Basics).

"Philips' Hue lights sync up with an Xbox One game", published Jul. 15, 2015 by Jon Fingas, Engadget (http://www.engadget.com/2015/07/15/hue-lights-sync-with-xbox-one-game/).

"Razer Goes Full Spectrum Color With All-New Chroma Feature", published Aug. 13, 2014 by Razer, Market Wired (http://www.marketwired.com/press-release/razer-goes-full-spectrum-color-with-all-new-chroma-feature-1937788.htm).

Office Action (including English Translation) dated Feb. 11, 2019, for the corresponding Chinese Application No. 201580085005.1 in 13 total pages.

Office Action (including English Translation) dated Aug. 31, 2020, for the corresponding Taiwanese Application No. 105133308 in 10 total pages.

* cited by examiner

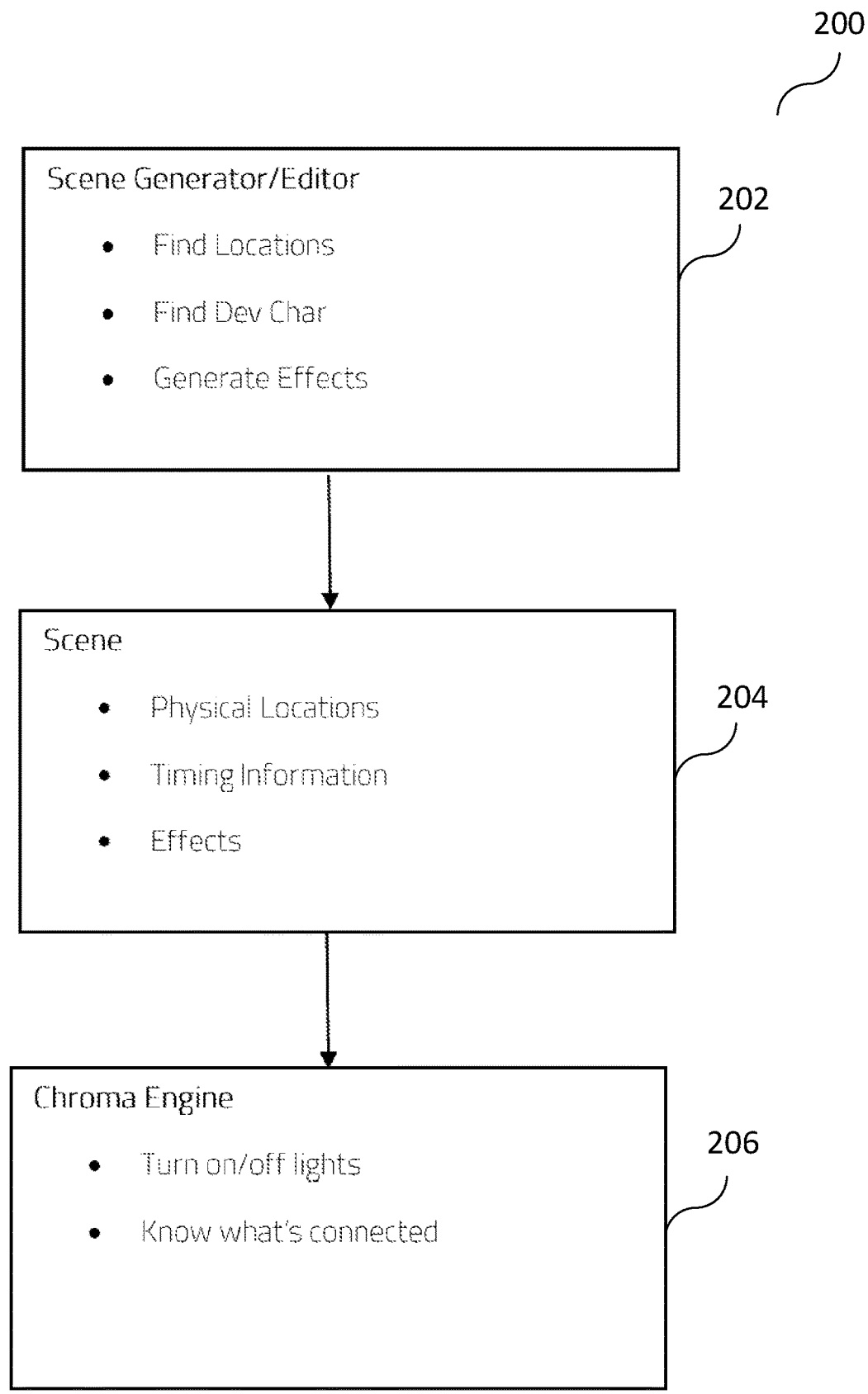

CONTROL METHODS, COMPUTER-READABLE MEDIA, AND CONTROLLERS

CROSS REFERENCE TO RELATED APPLICATIONS

This application is a continuation of U.S. application Ser. No. 15/773,488, filed on May 3, 2018, which is a national stage entry of PCT/SG2015/050429, filed on Nov. 3, 2015; both of which are expressly incorporated by reference herein in their entireties.

TECHNICAL FIELD

Various embodiments generally relate to control methods, computer-readable media, and controllers.

BACKGROUND

Various computer peripheral devices such as keyboards, mice, mouse mats, speakers, include lights, which may be configured and controlled by the user individually for each peripheral device. However, configuring the lights for multiple devices so as to achieve a seamless coordinated and synchronized lighting effect across multiple peripheral devices is complicated. As such, there may be a need to provide methods for configuring the lighting effects on multiple devices.

SUMMARY OF THE INVENTION

According to various embodiments, a control method may be provided. The control method may include: determining geometric information about respective geometries of respective housings of a plurality of light sources; determining a photographic representation of an environment in which the plurality of light sources are provided; determining spatial information about the plurality of light sources based on the geometric information and based on the photographic representation; determining control information for the plurality of light sources based on the spatial information; and controlling the plurality of light sources based on the control information.

According to various embodiments, a computer-readable medium may be provided. The computer-readable medium may include instructions which, when executed by a computer, make the computer perform a control method, the control method including: determining geometric information about respective geometries of respective housings of a plurality of light sources; determining a photographic representation of an environment in which the plurality of light sources are provided; determining spatial information about the plurality of light sources based on the geometric information and based on the photographic representation; determining control information for the plurality of light sources based on the spatial information; and controlling the plurality of light sources based on the control information.

According to various embodiments, a controller may be provided. The controller may include: a geometry determination circuit configured to determine geometric information about respective geometries of respective housings of a plurality of light sources; an imaging circuit configured to determine a photographic representation of an environment in which the plurality of light sources are provided; a spatial information determination circuit configured to determine spatial information about the plurality of light sources based on the geometric information and based on the photographic representation; a control information determination circuit configured to determine control information for the plurality of light sources based on the spatial information; and a control circuit configured to control the plurality of light sources based on the control information.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which:

FIG. 2 shows a diagram illustrating an overview of a method according to various embodiments.

DETAILED DESCRIPTION

Figure 1A:
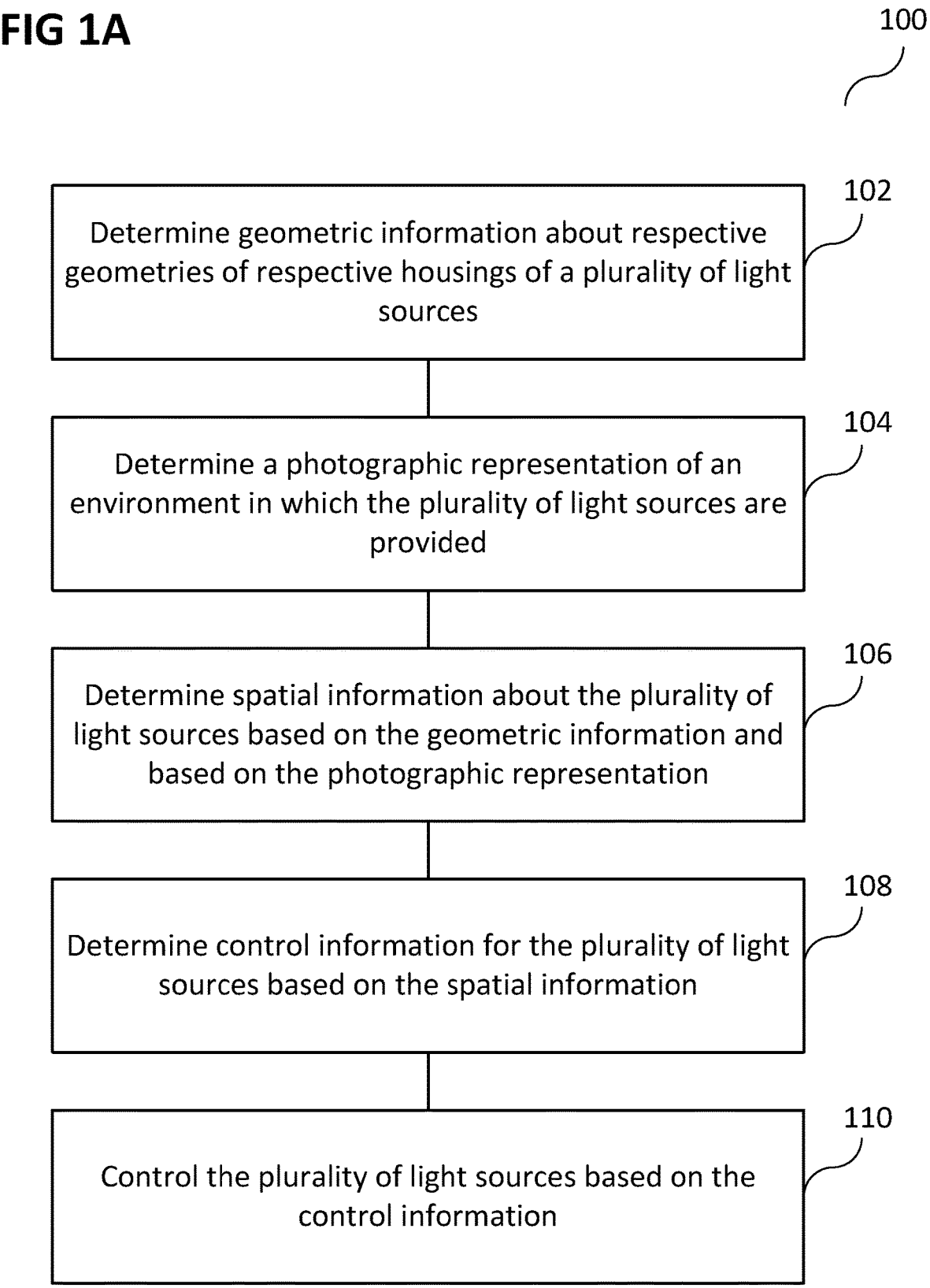
FIG. 1A shows a flow diagram illustrating a control method according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the controller as described in this description may include a memory which is for example used in the processing carried out in the controller. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed or attached, or just in contact without any fixation, and it will be understood that both direct coupling or indirect coupling (in other words: coupling without direct contact) may be provided.

Various computer peripheral devices such as keyboards, mice, mouse mats, speakers, include lights, which may be configured and controlled by the user individually for each peripheral device. However, configuring the lights for multiple devices so as to achieve a seamless coordinated and synchronized lighting effect across multiple peripheral devices is complicated. As such, there may be a need to provide methods for configuring the lighting effects on multiple devices.

According to various embodiments, methods and devices (for example a computer vision based system) for configuration and coordinated animation of lighting effects may be provided.

According to various embodiments, methods and devices may be provided for controlling and configuring animated lighting effects of multiple devices with controllable lighting sources.

According to various embodiments, devices and methods may be provided for configurable lighting effects across multiple devices.

FIG. 1A shows a flow diagram 100 illustrating a control method according to various embodiments. In 102, geometric information about respective geometries of respective housings of a plurality of light sources may be determined. In 104, a photographic representation of an environment in which the plurality of light sources are provided may be determined. In 106, spatial information about the plurality of light sources may be determined based on the geometric information and based on the photographic representation. In 108, control information for the plurality of light sources may be determined based on the spatial information. In 110, the plurality of light sources may be controlled based on the control information.

In other words, a plurality of light sources may be controlled based on a determination of a location and/or orientation of the respective housings of the light sources with known geometry.

According to various embodiments, the plurality of light sources may be provided in at least one computer peripheral device.

According to various embodiments, the geometric information may be determined based on a database of geometries of housings.

According to various embodiments, the geometric information may be determined based on a user input identifying types of light sources provided in the environment.

According to various embodiments, the spatial information may include or may be information indicating a relative position of each light source of the plurality of light sources with respect to at least one other light source of the plurality of light sources, and/or a relative orientation of each light source of the plurality of light sources with respect to at least one other light source of the plurality of light sources, and/or an absolute position of each light source of the plurality of light sources, and/or an absolute orientation of each light source of the plurality of light sources.

According to various embodiments, the photographic representation may include a two-dimensional scan (for example a (for example static or for example dynamic) electronic image or (for example static or for example dynamic) electronic photo or electronic video or electronic movie) of an environment in which the plurality of light sources are located or a three-dimensional scan of an environment in which the plurality of light sources are located or a movie of an environment in which the plurality of light sources are located.

According to various embodiments, the control information may be determined further based on input from a user of the control method.

According to various embodiments, the control information may be determined further based on a pre-defined animation sequence.

According to various embodiments, the control information may include or may be or may be included in timing information for each light source of the plurality of light sources for switching on or off the light source.

According to various embodiments, the control information may include or may be or may be included in color information for each light source of the plurality of light sources.

According to various embodiments, controlling the plurality of light sources may include or may be controlling the plurality of light sources to obtain a synchronized lighting effect, a coordinated lighting effect, an animated lighting effect, a propagating wave lighting effect, a breathing lighting effect, and/or a spectrum lighting effect.

According to various embodiments, a computer-readable medium may be provided. The computer-readable medium may include instructions which, when executed by a computer, make the computer perform a control method. The control method may include: determining geometric information about respective geometries of respective housings of a plurality of light sources; determining a photographic representation of an environment in which the plurality of light sources are provided; determining spatial information about the plurality of light sources based on the geometric information and based on the photographic representation; determining control information for the plurality of light sources based on the spatial information; and controlling the plurality of light sources based on the control information.

According to various embodiments, the plurality of light sources may be provided in at least one computer peripheral device.

According to various embodiments, the geometric information may be determined based on a database of geometries of housings.

According to various embodiments, the geometric information may be determined based on a user input identifying types of light sources provided in the environment.

According to various embodiments, the spatial information may include or may be information indicating a relative position of each light source of the plurality of light sources with respect to at least one other light source of the plurality of light sources, and/or a relative orientation of each light source of the plurality of light sources with respect to at least one other light source of the plurality of light sources, and/or an absolute position of each light source of the plurality of light sources, and/or an absolute orientation of each light source of the plurality of light sources.

According to various embodiments, the photographic representation may include at least one of a two-dimensional scan of an environment in which the plurality of light sources are located or a three-dimensional scan of an environment in which the plurality of light sources are located or a movie of an environment in which the plurality of light sources are located.

According to various embodiments, the control information may be determined further based on input from a user of the control method.

According to various embodiments, the control information may be determined further based on a pre-defined animation sequence.

According to various embodiments, the control information may include or may be or may be included in timing information for each light source of the plurality of light sources for switching on or off the light source.

According to various embodiments, the control information may include or may be or may be included in color information for each light source of the plurality of light sources.

According to various embodiments, controlling the plurality of light sources may include or may be controlling the plurality of light sources to obtain a synchronized lighting effect, a coordinated lighting effect, an animated lighting effect, a propagating wave lighting effect, a breathing lighting effect, and/or a spectrum lighting effect.

Figure 1B:
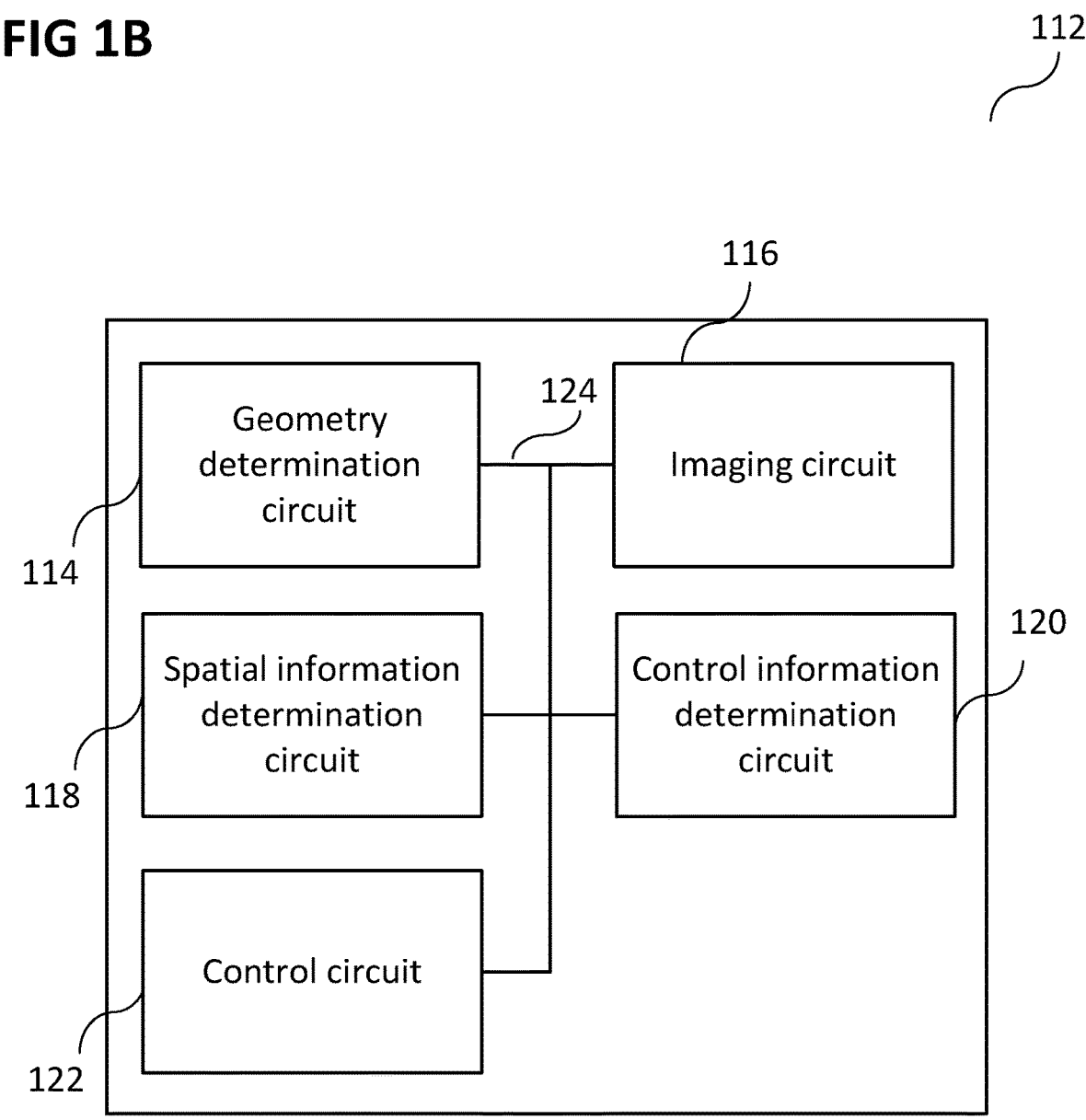
FIG. 1B shows a controller according to various embodiments.

FIG. 1B shows a controller 112 according to various embodiments. The controller 112 may include a geometry determination circuit 114 configured to determine geometric information about respective geometries of respective housings of a plurality of light sources. The controller 112 may further include an imaging circuit 116 configured to determine a photographic representation of an environment in which the plurality of light sources are provided. The controller 112 may further include a spatial information determination circuit 118 configured to determine spatial information about the plurality of light sources based on the geometric information and based on the photographic representation. The controller 112 may further include a control information determination circuit 120 configured to determine control information for the plurality of light sources based on the spatial information. The controller 112 may further include a control circuit 122 configured to control the plurality of light sources based on the control information. The geometry determination circuit 114, the imaging circuit 116, the spatial information determination circuit 118, the control information determination circuit 120, and the control circuit 122 may be coupled with each other, like indicated by lines 124, for example electrically coupled, for example using a line or a cable, and/or mechanically coupled.

According to various embodiments, the plurality of light sources may be provided in at least one computer peripheral device.

According to various embodiments, the geometry determination circuit 114 may be configured to determine the geometric information based on a database of geometries of housings.

According to various embodiments, the geometry determination circuit 114 may be configured to determine the geometric information based on a user input identifying types of light sources provided in the environment.

According to various embodiments, the spatial information may include or may be information indicating a relative position of each light source of the plurality of light sources with respect to at least one other light source of the plurality of light sources, and/or a relative orientation of each light source of the plurality of light sources with respect to at least one other light source of the plurality of light sources, and/or an absolute position of each light source of the plurality of light sources, and/or an absolute orientation of each light source of the plurality of light sources.

According to various embodiments, the photographic representation may include or may be a two-dimensional scan of an environment in which the plurality of light sources are located and/or a three-dimensional scan of an environment in which the plurality of light sources are located or a movie of an environment in which the plurality of light sources are located.

According to various embodiments, the control information determination circuit 120 may be configured to determine the control information further based on input from a user of the control method.

According to various embodiments, the control information determination circuit 120 may be configured to determine the control information further based on a pre-defined animation sequence.

According to various embodiments, the control information may include or may be or may be included in timing information for each light source of the plurality of light sources for switching on or off the light source.

According to various embodiments, the control information may include or may be or may be included in color information for each light source of the plurality of light sources.

According to various embodiments, the control circuit 122 may be configured to control the plurality of light sources to obtain at least one of a synchronized lighting effect, a coordinated lighting effect, an animated lighting effect, a propagating wave lighting effect, a breathing lighting effect, or a spectrum lighting effect.

According to various embodiments, coordinating and synchronizing lighting effects amongst devices that are spatially distributed in an arbitrary manner may use knowledge of the relative locations of the participating devices. Using computer vision techniques, the spatial relationships between such devices may be identified and timing and color patters may be adjusted according to these parameters.

According to various embodiments, with the spatial information, such dynamic effects that use time, color and space information may be rendered in a smoother, more coordinated fashion.

According to various embodiments, in a room or space that has a number of devices with controllable lighting sources, if someone wanted to make an effect such as a propagating wave through the devices that had even timing and smooth transitions, it may be desired to know where each light is located in the space so each light can be turned on at the right moment.

For example, three lights on three different devices may be provided. For example, it may be desired to sequence the lighting so that number one (in other words: a first device of the three different devices) turns on, then number two (in other words: a second device of the three different devices), and then three (in other words: a third device of the three different devices). It may be desired to appear that the light is actually traveling from one light to another at a specific speed. It may be determined which light to turn on and when it should go on. Now, assuming that a fourth lighted device is added and the fourth lighted device is to be added to the system. The system may be reprogrammed to insert control instructions for the fourth device in the right place and modify information with any adjacent lights. It will be understood that there may be multiple lights on a device and multiple devices, so that the problem becomes even more complex. For example, a smooth wave may be coordinated from a mouse to a keyboard (for example a Chroma Black Widow) to a faline on your desktop that looks like it is propagating smoothly. It will be understood that a faline is a mouse mat with a LED (light emitting diode) array around its border. Such mouse mat devices may have different variations of LED geometries. According to various embodiments, devices and methods may be provided which can be used for coordination of various classes of devices with lighting capabilities. Now adding a monitor with Chroma capabilities and maybe a desktop speaker may require a reprogramming.

According to various embodiments, with a specific spatial location and device control address, a model of the space may be built and 2d or 3d effects (for example a spherical explosion wave from the center of the room propagating to my ambient light sources mounted on the walls) may be applied. Applying the effect may for example be taking a 3d animation and using voxel information to control the light sources. In 2d, a light source would correspond to a pixel.

According to various embodiments, one or more of the following steps may be performed to achieve this result:

A user may take a photo of an environment in which the light sources are provided (for example of the user's desktop);

Using computer vision techniques, the system may identify relative spatial locations of all system light-able elements (in other words: of all light sources) in the scene;

The system may take advantage of known device geometries (for example of the devices with the light sources) to optimize the object recognition task;

The system may present a lighting authoring system to the user that allows the user to choose multi-device wide effects;

The system may take into consideration spatial relationships to modulate timing and other color space parameters to smoothly span the space;

Alternative to a photo or still image, a user may take a video to better identify participating devices and further analyze and compensate for any dynamic constraints a device may have;

In the case of using a video, the system may use a dynamic test pattern for calibration purposes and optimizing spatial segmentation. For example, the system may use the dynamic pattern to obtain more reliable and accurate spatial resolution and temporal response of lighting enabled devices in the space.

It will be understood that a user may be able to scan an entire space, i.e., may not be constrained to a desktop to identify all lightable devices (in other words: all devices with a light source; in other words: all light source devices).

According to various embodiments, devices and methods may take advantage of several device aspects:

knowledge of the exact geometry of the device due to precise device identification;

with this additional knowledge, there may also be knowledge of device orientation which may provide precise rotation (in other words: orientation) and position of each of the lighting elements (this may be accomplished based on a combination of real device modelling and 3D image processing techniques);

lighting signatures may be sent for the purposes of identification such that the system making it more robust to ambient light interference.

According to various embodiments, an entire scene may be represented using 3D modelling. These models maybe used in multi-view authoring environments or head mounted displays for virtual reality and augmented reality systems to provide further device alignment and locations.

According to various embodiments, access to precise 3D models of identified devices may be provided, and thus, exact model representations may be overlaid in the image based scene to achieve precise registration of the model and the real-world.

According to various embodiments, devices and methods may take advantage of specific device performance characteristics and device capabilities to tune spatially distributed effects across devices. For example, with knowledge of the specific devices, embedded effects or specialized lighting delays may be invoked to further enhance the results. For example, the devices themselves may be adapted to achieve the best result in the target environment.

According to various embodiments, if the target devices have interactive capabilities, interactions with a specific device may trigger system wide effects. For example, the effects need not be triggered from a central location.

According to various embodiments, devices and methods may be provided for scene authoring. With known spatial relationships and a 2D image based map of the area to be lit, the user may apply 2D dynamic effects over the image to generate lighting effects mapped to the devices. If a 3D representation of the space exists, 3D lighting effects may be applied in the same manner.

According to various embodiments, a user may configure lighting effects across multiple devices with controllable lighting sources such that a coordinated seamless lighting effect flows through multiple devices to create a 2D or 3D lighting effect.

Various embodiments may be implemented in the form of an app (application), for example a mobile phone application, or a software on any other kind of computing system.

Various embodiments (for example in an application) may integrate all input devices and may have the capability of lighting the input device, e.g., light bulb, mouse pad, mouse, keyboard, keypads, controller, monitor, CPU (central processing unit) case, etc., by detecting these devices.

The user may take a picture or a video of the layout of these devices and the application may compute the relative location and dimensions of each detected input device. Once computed, the user may configure a lighting effect such as a propagating wave, breathing, spectrum, etc. lighting effect. The result may be a synchronized, coordinated and animated user-configured lighting effect that transitions well across all detected input devices to provide user with an immersive user experience while gaming or just simply using the computer.

FIG. 2 shows a diagram 200 illustrating an overview of a method according to various embodiments. In 202, a scene generator (or editor) may find locations, may find dev (device) char (characteristics), and may generate effects. In 204, a scene may be created, based on information on physical locations, timing information, and effects. In 206, a controller (which may be referred to as an engine; for example a Chroma Engine) may turn on/off lights, for example based on identifying (in other words: knowing) which devices including a light source are connected.

According to various embodiments, the generator may take as inputs: a computer image or video; mechanical information from (or of) the devices (such as dimensions, spatial location etc.); and/or an effects library including image overlays state images or image overlays dynamic videos.

According to various embodiments, the generator may provide as outputs: a scene description data structure; light array locations; and/or light devices characteristics (for example hue color response or timing information).

The following examples pertain to further embodiments.

Example 1 is a control method comprising: determining geometric information about respective geometries of respective housings of a plurality of light sources; determining a photographic representation of an environment in which the plurality of light sources are provided; determining spatial information about the plurality of light sources based on the geometric information and based on the photographic representation; determining control information for the plurality of light sources based on the spatial information; and controlling the plurality of light sources based on the control information.

In example 2, the subject-matter of example 1 can optionally include that the plurality of light sources are provided in at least one computer peripheral device.

In example 3, the subject-matter of any one of examples 1 to 2 can optionally include that the geometric information is determined based on a database of geometries of housings.

In example 4, the subject-matter of any one of examples 1 to 3 can optionally include that the geometric information is determined based on a user input identifying types of light sources provided in the environment.

In example 5, the subject-matter of any one of examples 1 to 4 can optionally include that the spatial information comprises information indicating at least one of a relative position of each light source of the plurality of light sources with respect to at least one other light source of the plurality of light sources, a relative orientation of each light source of the plurality of light sources with respect to at least one other light source of the plurality of light sources, an absolute position of each light source of the plurality of light sources, or an absolute orientation of each light source of the plurality of light sources.

In example 6, the subject-matter of any one of examples 1 to 5 can optionally include that the photographic representation comprises at least one of a two-dimensional scan of an environment in which the plurality of light sources are located or a three-dimensional scan of an environment in which the plurality of light sources are located or a movie of an environment in which the plurality of light sources are located.

In example 7, the subject-matter of any one of examples 1 to 6 can optionally include that the control information is determined further based on input from a user of the control method.

In example 8, the subject-matter of any one of examples 1 to 7 can optionally include that the control information is determined further based on a pre-defined animation sequence.

In example 9, the subject-matter of any one of examples 1 to 8 can optionally include that the control information comprises timing information for each light source of the plurality of light sources for switching on or off the light source.

In example 10, the subject-matter of any one of examples 1 to 9 can optionally include that the control information comprises color information for each light source of the plurality of light sources.

In example 11, the subject-matter of any one of examples 1 to 10 can optionally include that controlling the plurality of light sources comprises controlling the plurality of light sources to obtain at least one of a synchronized lighting effect, a coordinated lighting effect, an animated lighting effect, a propagating wave lighting effect, a breathing lighting effect, or a spectrum lighting effect.

Example 12 is a computer-readable medium comprising instructions which, when executed by a computer, make the computer perform a control method, the control method comprising: determining geometric information about respective geometries of respective housings of a plurality of light sources; determining a photographic representation of an environment in which the plurality of light sources are provided; determining spatial information about the plurality of light sources based on the geometric information and based on the photographic representation; determining control information for the plurality of light sources based on the spatial information; and controlling the plurality of light sources based on the control information.

In example 13, the subject-matter of example 12 can optionally include that the plurality of light sources are provided in at least one computer peripheral device.

In example 14, the subject-matter of any one of examples 12 to 13 can optionally include that the geometric information is determined based on a database of geometries of housings.

In example 15, the subject-matter of any one of examples 12 to 14 can optionally include that the geometric information is determined based on a user input identifying types of light sources provided in the environment.

In example 16, the subject-matter of any one of examples 12 to 15 can optionally include that the spatial information comprises information indicating at least one of a relative position of each light source of the plurality of light sources with respect to at least one other light source of the plurality of light sources, a relative orientation of each light source of the plurality of light sources with respect to at least one other light source of the plurality of light sources, an absolute position of each light source of the plurality of light sources, or an absolute orientation of each light source of the plurality of light sources.

In example 17, the subject-matter of any one of examples 12 to 16 can optionally include that the photographic representation comprises at least one of a two-dimensional scan of an environment in which the plurality of light sources are located or a three-dimensional scan of an environment in which the plurality of light sources are located or a movie of an environment in which the plurality of light sources are located.

In example 18, the subject-matter of any one of examples 12 to 17 can optionally include that the control information is determined further based on input from a user of the control method.

In example 19, the subject-matter of any one of examples 12 to 18 can optionally include that the control information is determined further based on a pre-defined animation sequence.

In example 20, the subject-matter of any one of examples 12 to 19 can optionally include that the control information comprises timing information for each light source of the plurality of light sources for switching on or off the light source.

In example 21, the subject-matter of any one of examples 12 to 20 can optionally include that the control information comprises color information for each light source of the plurality of light sources.

In example 22, the subject-matter of any one of examples 12 to 21 can optionally include that controlling the plurality of light sources comprises controlling the plurality of light sources to obtain at least one of a synchronized lighting effect, a coordinated lighting effect, an animated lighting effect, a propagating wave lighting effect, a breathing lighting effect, or a spectrum lighting effect.

Example 23 is a controller comprising: a geometry determination circuit configured to determine geometric information about respective geometries of respective housings of a plurality of light sources; an imaging circuit configured to determine a photographic representation of an environment in which the plurality of light sources are provided; a spatial information determination circuit configured to determine spatial information about the plurality of light sources based on the geometric information and based on the photographic representation; a control information determination circuit configured to determine control information for the plurality of light sources based on the spatial information; and a control circuit configured to control the plurality of light sources based on the control information.

In example 24, the subject-matter of example 23 can optionally include that the plurality of light sources are provided in at least one computer peripheral device.

In example 25, the subject-matter of any one of examples 23 to 24 can optionally include that the geometry determination circuit is configured to determine the geometric information based on a database of geometries of housings.

In example 26, the subject-matter of any one of examples 23 to 25 can optionally include that the geometry determination circuit is configured to determine the geometric information based on a user input identifying types of light sources provided in the environment.

In example 27, the subject-matter of any one of examples 23 to 26 can optionally include that the spatial information comprises information indicating at least one of a relative position of each light source of the plurality of light sources with respect to at least one other light source of the plurality of light sources, a relative orientation of each light source of the plurality of light sources with respect to at least one other light source of the plurality of light sources, an absolute position of each light source of the plurality of light sources, or an absolute orientation of each light source of the plurality of light sources.

In example 28, the subject-matter of any one of examples 23 to 27 can optionally include that the photographic representation comprises at least one of a two-dimensional scan of an environment in which the plurality of light sources are located or a three-dimensional scan of an environment in which the plurality of light sources are located or a movie of an environment in which the plurality of light sources are located.

In example 29, the subject-matter of any one of examples 23 to 28 can optionally include that the control information determination circuit is configured to determine the control information further based on input from a user of the control method.

In example 30, the subject-matter of any one of examples 23 to 29 can optionally include that the control information determination circuit is configured to determine the control information further based on a pre-defined animation sequence.

In example 31, the subject-matter of any one of examples 23 to 30 can optionally include that the control information comprises timing information for each light source of the plurality of light sources for switching on or off the light source.

In example 32, the subject-matter of any one of examples 23 to 31 can optionally include that the control information comprises color information for each light source of the plurality of light sources.

In example 33, the subject-matter of any one of examples 23 to 32 can optionally include that the control circuit is configured to control the plurality of light sources to obtain at least one of a synchronized lighting effect, a coordinated lighting effect, an animated lighting effect, a propagating wave lighting effect, a breathing lighting effect, or a spectrum lighting effect.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A control method for synchronized lighting effects comprising:
    mapping a lighting effect to a plurality of light sources provided in an environment, based on spatial information, using computer vision techniques, about the plurality of light sources in the environment;
    modulating timing, color and space parameters of the plurality of light sources to smoothly span the lighting effect across the environment;
    determining control information for the plurality of light sources based on the mapping and the modulation;
    controlling the plurality of light sources based on the control information to create the lighting effect, wherein the plurality of light sources comprises at least one computer peripheral device and at least one ambient light source in the environment; and
    determining spatial information about the plurality of light sources based on geometric information about respective geometries of respective housings of the plurality of light sources, wherein the geometric information comprises positions of one or more light elements on each light source of the plurality of light sources.

2. The control method of claim 1, further comprising:
    determining the geometric information based on at least one of a database of geometries of housings or a user input identifying types of light sources provided in the environment.

3. The control method of claim 1, further comprising:
determining spatial information about the plurality of light sources based on a photographic representation of the environment.

4. The control method of claim 3, wherein the photographic representation comprises at least one of a two-dimensional scan of an environment in which the plurality of light sources are located or a three-dimensional scan of an environment in which the plurality of light sources are located or a movie of an environment in which the plurality of light sources are located.

5. The control method of claim 3, further comprising:
detecting a new light source from the photographic representation;
determining spatial information about the new light source based on the photographic representation; and
updating control information for the plurality of light sources based on the spatial information of the new light source.

6. The control method of claim 1, wherein controlling the plurality of light sources comprises controlling the plurality of light sources to operate sequentially such that the lighting effect appears to travel across the plurality of light sources.

7. The control method of claim 1, wherein the spatial information comprises information indicating at least one of a relative position of each light source of the plurality of light sources with respect to at least one other light source of the plurality of light sources, a relative orientation of each light source of the plurality of light sources with respect to at least one other light source of the plurality of light sources, an absolute position of each light source of the plurality of light sources, or an absolute orientation of each light source of the plurality of light sources.

8. The control method of claim 1, further comprising:
building a three-dimensional representation of the environment, wherein each light source of the plurality of light sources corresponds to a voxel in the representation; and
controlling the plurality of light sources based on information pertaining to the voxel in the representation that corresponds to each of the plurality of light sources;
wherein the lighting effect is three-dimensional.

9. The control method of claim 1, wherein the control information is determined further based on at least one of input from a user of the control method or a pre-defined animation sequence.

10. The control method of claim 1, wherein the control information comprises at least one of timing information for each light source of the plurality of light sources for switching on or off the light source, and color information for each light source of the plurality of light sources.

11. The control method of claim 1, wherein controlling the plurality of light sources comprises controlling the plurality of light sources to obtain at least one of a synchronized lighting effect, a coordinated lighting effect, an animated lighting effect, a propagating wave lighting effect, a breathing lighting effect, or a spectrum lighting effect.

12. A non-transitory computer-readable medium comprising instructions for synchronized lighting effects which, when executed by a computer, make the computer perform a control method, the control method comprising:
mapping a lighting effect to a plurality of light sources provided in an environment, based on spatial information, using computer vision techniques, about the plurality of light sources in the environment;
modulating timing, color and space parameters of the plurality of light sources to smoothly span the lighting effect across the environment;
determining control information for the plurality of light sources based on the mapping and the modulation;
controlling the plurality of light sources based on the control information to create the lighting effect, wherein the plurality of light sources comprises at least one computer peripheral device and at least one ambient light source in the environment; and
determining spatial information about the plurality of light sources based on geometric information about respective geometries of respective housings of the plurality of light sources, wherein the geometric information comprises positions of one or more light elements on each light source of the plurality of light sources.

13. A controller for synchronized lighting effects comprising:
a control information determination circuit configured to determine control information for a plurality of light sources provided in an environment, wherein the control information determination circuit is configured to determine the control information by mapping a lighting effect to the plurality of light sources based on spatial information, using computer vision techniques, of the plurality of light sources in the environment, and modulating timing, color and space parameters of the plurality of light sources to smoothly span the lighting effect across the environment;
a control circuit configured to control the plurality of light sources based on the control information to create the lighting effect, wherein the plurality of light sources comprises at least one computer peripheral device and at least one ambient light source in the environment; and
a geometry determination circuit configured to determine geometric information about respective geometries of respective housings of the plurality of light sources, wherein the geometric information comprises positions of one or more lighting elements on each of the plurality of light sources.

14. The controller of claim 13, further comprising:
an imaging circuit configured to determine a photographic representation of the environment.

15. The controller of claim 13, further comprising:
a spatial information determination circuit configured to determine spatial information about the plurality of light sources based on the geometric information.

16. The controller of claim 13, further comprising:
a spatial information determination circuit configured to determine spatial information about the plurality of light sources based on the photographic representation.

* * * * *